United States Patent Office 2,839,376
Patented June 17, 1958

2,839,376
NITROGEN-PHOSPHORUS COMPOSITION

Curtis G. Christian, Anaheim, Calif., assignor, by mesne assignments, to Collier Carbon and Chemical Corporation, a corporation of California No Drawing. Application January 27, 1955
Serial No. 484,575

7 Claims. (Cl. 71—32)

This invention relates to a new composition of matter comprising the elements nitrogen and phosphorus, and to a method by which such composition can be prepared.

A number of attempts have been made to prepare plant nutrient compositions containing maximum amounts of nitrogen and phosphorus by reacting phosphorus or phosphorus pentoxide with ammonia or mixtures of ammonia and oxygen. Prior to the present invention, however, the compositions so prepared were either hygroscopic, semi-pyrophoric, or noxious-smelling materials which were very unsatisfactory for use as fertilizers. In contrast, the nitrogen-phosphorus product provided by the present invention is unusually high in nitrogen and phosphorus, and is stable, non-hygroscopic, and odorless. It is well adapted to use as a fertilizer and may also be employed as an intermediate in the preparation of new phosphorus- and nitrogen-containing acid derivatives such as salts and esters. It takes the form of a white finely-divided amorphous solid which melts with decomposition at 290°–315° C., and has very limited solubility in water and common organic solvents. It is acidic in nature, having a pH value of about 8.5, and is slowly hydrolyzed by boiling water and by strong acids or aqueous bases. A typical ultimate analysis is as follows:

| | Percent |
|---|---|
| Total nitrogen | 21.0 |
| Total phosphorus | 31.8 |
| Total hydrogen | 3.7 |
| Oxygen (by difference) | 43.5 |
| Atomic ratio, N:P | 1.5:1.0 |

While its chemical analysis, infra-red spectrum, and other analytical properties indicate the product to be some type of a polymeric amidophosphoric acid, its molecular structure is not known with any degree of certainty; accordingly, it is herein described and claimed by means of its method of preparation rather than as a chemical compound whose identity is speculative at best.

The new product of the invention is obtained by reacting elemental phosphorus with oxygen and ammonia at a temperature below about 150° C. and thereafter immediately subjecting the product so obtained to a temperature above about 300° C. Careful observance of the stated temperature limitations is necessary to avoid the formation of hygroscopic noxious-smelling products similar to those previously known. To some extent the optimum temperature depends upon the amounts of ammonia and oxygen employed.

Conveniently, the initial reaction is carried out by heating yellow elemental phosphorus to a temperature slightly above its melting point, e. g., to 50°–60° C., and passing a gas mixture comprising ammonia and oxygen over the surface of the molten phosphorus while maintaining the environmental temperature below about 150° C., preferably between about 90° C. and about 140° C. The oxygen content of the gas mixture should not exceed about 5 percent by volume, and is preferably held to between about 0.1 and about 2.0 percent by volume. The ammonia content should be at least about 5 percent by volume and may comprise as high as 99.5 percent by volume. However, control of the reaction temperature is facilitated if the ammonia content of the gas mixture is held below about 50 percent by volume and the remainder of the mixture is an inert gas such as nitrogen, argon, etc. A useful gas mixture consists of about 10–15 percent by volume of ammonia, about 1.0–2.0 percent by volume of oxygen, and about 83–89 percent by volume of nitrogen. Suitable control of the reaction temperature may conveniently be attained by controlling the temperature and/or the composition of the gas mixture. According to a preferred method of operation the body of molten phosphorus is maintained at about 130° C. and the temperature of the gas mixture at its point of entry into the reaction vessel is maintained at about 95° C. Since the reaction is preferably effected by contacting the reactants at the surface of a body of molten phosphorus, the latter most efficiently should take the form of a thin film or layer so that maximum surface is exposed to the gas mixture. When operating continuously, the phosphorus may be fed to the surface of a heated revolving drum mounted in an oven through which the gas mixture is passed, so that the phosphorus melts and forms a thin film on the surface of the drum and maximum surface is exposed to the gas stream.

The reaction between the phosphorus, ammonia and oxygen as above described is accompanied by the copious evolution of white fumes which constitute an intermediate product of unknown identity. This product is passed directly to a heating zone or oven wherein it is subjected to a temperature above about 300° C., preferably between about 425° and about 600° C., for a period of time of between about 0.05 and about 5 seconds, preferably between about 0.2 and about 1 second. The heat-treated material is then withdrawn from the heating zone and collected by electrostatic precipitation, a bag-filter or a spray-washing system such as are used in collecting carbon black.

As will be apparent to those skilled in the art, various engineering and manipulative techniques may be applied in preparing the new product. The process by which it is prepared may be carried out batch-wise, semi-continuously or continuously, and various methods of achieving the proper temperatures and control of the same may be employed. In essence, the invention consists in the process of reacting elemental phosphorus with oxygen and ammonia at a temperature below about 150° C., followed by heating the product so formed to a temperature above about 300° C., and in the novel product so obtained.

The following example will illustrate one way in which the principle of the invention has been applied, but is not to be construed as limiting the same:

Example

Small pieces of yellow phosphorus were melted by heating to about 60° C., and the molten phosphorus was allowed to drain into a horizontally disposed tubular reaction chamber. A gas mixture consisting of 11.6 percent ammonia, 1.4 percent oxygen, and 87.0 percent nitrogen was warmed to a temperature of about 95° C., and passed through the reaction chamber in such manner that it swept across the surface of the molten phosphorus contained therein. The white fumes which were evolved from the surface of the phosphorus were swept from the reaction chamber by the gas stream and carried through a tubular heating chamber mounted in an oven. Within the heating chamber, the white product was subjected to a temperature of about 425° C. for a period of about 0.5 second. Beyond the heating chamber the gas stream was passed over an electrostatic precipitator whereby the product was collected as a very finely divided fluffy white powder having the ultimate analysis and properties previously stated.

In employing the new product as a fertilizer or plant nutrient, it may conveniently be applied to the soil and/or to plants in the form of an aqueous dispersion or suspension. The product is ordinarily obtained in such a fine state of subdivision that it forms relatively stable dispersions or suspensions in water without the aid of dispersing or suspending agents. However, such agents may be employed if desired. Since the product is exceptionally rich in nitrogen and phosphorus (having the fertilizer designation "22:72:0"), it is effective in relatively small quantities, and dispersions of the same having excellent plant nutrient value may be relatively dilute, e. g., they may contain as little as 0.1–5 percent of the active ingredient. The new product may also be directly worked into the soil in solid form, as by harrowing or the like.

Other modes of applying the principle of my invention may be employed instead of those explained, change being made as regards the materials or methods employed provided the steps or product stated by any of the following claims, or the equivalent of such stated steps or product, be employed or obtained.

I, therefore, particularly point out and distinctly claim as my invention:

1. The process which comprises contacting elemental phosphorus with a gas mixture comprising between about 0.1 and about 5 volume percent of oxygen and at least about 5 volume percent of ammonia at a reaction temperature below about 150° C., and thereafter subjecting the reaction product so obtained to a temperature above about 300° C. for a period of time between about 0.05 and about 5 seconds, whereby there is obtained a substantially non-hygroscopic amorphous white solid product having very limited solubility in water and containing nitrogen and phosphorus in an atomic ratio of about 1.5:1.0.

2. The process of claim 1 wherein the said gas mixture consists of between about 0.1 and about 5 volume percent of oxygen, between about 5 and about 50 volume percent of ammonia, and the remainder being a gas which is non-reactive at the said temperatures.

3. The process of claim 1 wherein the said gas mixture consists of between about 1 and about 2 volume percent of oxygen, between about 10 and about 15 volume percent of ammonia, and between about 83 and about 89 volume percent of nitrogen.

4. The process of claim 1 wherein the reaction temperature is between about 90° C. and about 140° C.

5. The process of claim 1 wherein the temperature to which the initial reaction product is subjected is between about 425° C. and about 600° C., and the time of said heating is between about 0.2 and about 1 second.

6. The process which comprises passing a gas mixture comprising between about 0.1 and about 5 volume percent of oxygen and at least about 5 volume percent of ammonia over the surface of a body of molten yellow phosphorus while maintaining an environmental temperature between about 90° C. and about 140° C., whereby white fumes are evolved from said surface; carrying said fumes through a heating zone wherein they are subjected to a temperature between about 425° C. and about 600° C. for a period of time between about 0.05 and about 5 seconds; and thereafter collecting the product so formed, said product being a substantially non-hygroscopic amorphous white solid having very limited solubility in water and containing nitrogen and phosphorus in an atomic ratio of about 1.5:1.0.

7. The process of claim 6 wherein the said body of molten phosphorus is maintained at a temperature of about 130° C., and the said gas mixture is maintained at a temperature of about 95° C.

References Cited in the file of this patent
UNITED STATES PATENTS

| | | |
|---|---|---|
| 2,122,122 | Woodstock | June 28, 1938 |
| 2,561,415 | Rice | July 24, 1951 |
| 2,689,780 | Rice | Sept. 21, 1954 |
| 2,713,536 | Driskell | July 19, 1955 |
| 2,717,198 | Jones et al. | Sept. 6, 1955 |